(12) United States Patent
Haran

(10) Patent No.: US 8,436,751 B2
(45) Date of Patent: May 7, 2013

(54) RELIABLE BROADCAST TRANSMISSION IN A VEHICULAR ENVIRONMENT

(75) Inventor: Onn Haran, Bnei Dror (IL)

(73) Assignee: Autotalks Ltd., Kfar Netter (IL)

( * ) Notice: Subject to any disclaimer, the term of this patent is extended or adjusted under 35 U.S.C. 154(b) by 164 days.

(21) Appl. No.: 12/996,390

(22) PCT Filed: Mar. 17, 2009

(86) PCT No.: PCT/IB2009/051111
§ 371 (c)(1),
(2), (4) Date: Dec. 6, 2010

(87) PCT Pub. No.: WO2010/004443
PCT Pub. Date: Jan. 14, 2010

(65) Prior Publication Data
US 2011/0109482 A1    May 12, 2011

Related U.S. Application Data

(60) Provisional application No. 61/079,278, filed on Jul. 9, 2008.

(51) Int. Cl.
*G08G 1/123* (2006.01)
(52) U.S. Cl.
USPC .............. 340/995.1; 340/539.3; 370/328; 370/329; 370/338; 370/330; 455/3.01; 455/63.1
(58) Field of Classification Search ............... 340/995.1, 340/539.3, 904, 988; 370/328, 338, 392, 370/329, 462, 330; 701/1, 301; 455/414.1, 455/414.2, 3.01, 63.1
See application file for complete search history.

(56) References Cited

U.S. PATENT DOCUMENTS

| | | | | |
|---|---|---|---|---|
| 6,349,210 | B1 * | 2/2002 | Li | 455/450 |
| 7,424,225 | B1 * | 9/2008 | Elliott | 398/115 |
| 2003/0033394 | A1 * | 2/2003 | Stine | 709/222 |
| 2005/0033511 | A1 * | 2/2005 | Pechatnikov et al. | 701/210 |

OTHER PUBLICATIONS

IEEE Standard for Information technology—Telecommunications and information exchange between systems—Local and metropolitan area networks—Specific requirements, Part 11: Wireless LAN Medium Access Control (MAC) and Physical Layer (PHY) Specifications, IEEE Computer Society, IEEE Std 802.11-2007, pp. 1-1232.

* cited by examiner

*Primary Examiner* — Hol Lau
(74) *Attorney, Agent, or Firm* — Mark M. Friedman

(57) ABSTRACT

Methods for reliable broadcast transmission in a vehicular environment comprise providing a dynamic local map for a driven vehicle, selecting a pivot vehicle based on the local map and optionally on a radio frequency coverage limit and performing a RTS/CTS handshake between the driven vehicle and the pivot vehicle. The CTS message by the pivot vehicle clears the way for the driven vehicle to broadcast data to other vehicles in the environment.

17 Claims, 12 Drawing Sheets

RELIABLE BROADCAST TRANSMISSION IN A VEHICULAR ENVIRONMENT

FIELD OF THE INVENTION

The invention relates in general to communication networks and in particular to real time, vehicle-to-vehicle and vehicle-to-infrastructure ad-hoc communication networks.

BACKGROUND OF THE INVENTION

Real time vehicle-to-vehicle and vehicle-to-infrastructure ad-hoc communication networks are known. A vehicle may be equipped with radio frequency (RF) transmission and reception capabilities. Transmitting and receiving vehicles are also referred to as "stations". The IEEE802.11p standard provides a common platform for communications in such networks. All vehicles equipped with vehicle-to-vehicle communication equipment transmit periodically their location information in packets called "beacons". However, IEEE802.11p cannot guarantee communications performance in a congested environment, since the deterministic arrival of beacons is not guaranteed. This leads to various problems. For example, lost safety messages translate into increased safety message "blind time", which diminishes the safety benefit of vehicle-to-vehicle and vehicle-to-infrastructure communications.

With no access point to coordinate packets transmission, IEEE802.11p stations use a Communication Sense Multiple Access with Collision Avoidance (CSMA/CA) mechanism for transmission. With many surrounding vehicles on a highway or at an intersection, the hidden node problem becomes the limiting factor of the network. This problem is shown in FIG. 1, which illustrates a typical scenario on a road 110. A circle surrounding a vehicle represents its transmission range. A perfect path exists between a vehicle 100 and a vehicle 102. Vehicle 100 is "hidden" to vehicle 104. Therefore, vehicle 104 may initiate transmission despite of an ongoing transmission by vehicle 100. The concurrent (with that of vehicle 100) transmission by vehicle 104 will cause vehicle 102 not to "hear" vehicle 100.

An intersection such as intersection 220 in FIG. 2 between two roads 222 and 224 is even more problematic. Here, the hidden node problem is amplified due to lack of a line of sight between different vehicle pairs. As illustrated in FIG. 2, in a worst case, the transmission of a vehicle 200 to a vehicle 210 may be adversely affected or even interrupted by four different vehicles, 202, 204, 206 and 208.

Existing solutions to the hidden node problem include use of Unicast networks endowed with a Request to Send/Clear to Send (RTS/CTS) scheme. A "source" station that wishes to transmit requests permission from a "destination" station by sending a RTS message to that station. The destination station replies with a CTS message. This exchange constitutes a RTS/CTS "handshake". Once permission is granted through the CTS message reply, the source station may transmit toward the destination station, with the guarantee that other stations surrounding the destination station are silent. In the past, the RTS/CTS scheme was not permitted use with broadcast packets. Now, standard revision 802.11e permits such use, albeit in an unspecified way.

Selecting an arbitrary vehicle for a RTS/CTS handshake for the purpose of broadcast transmission cannot work, because the arbitrary selection cannot clear a specific area. This can be seen in FIG. 1, in the exemplary case where vehicle 106 is selected for the handshake by vehicle 100, which sends the RTS message. Vehicle 106 is located close to vehicle 100. However, the returning CTS message does not propagate to a larger distance than the original RTS message, and therefore the clearance range is not extended. The problem is even clearer when one looks at FIG. 2. Therefore, arbitrary RTS/CTS cannot be applied in broadcast.

Another method promoted in the industry is time division multiple access (TDMA). By synchronizing all stations, each station is assigned a known time slot. It is guaranteed that during this time slot, no other station in proximity will transmit. Several TDMA concepts were studied in the context relevant herein. However, IEEE802.11p does not include TDMA, and it cannot be adapted or changed to include TDMA.

SUMMARY OF THE INVENTION

The invention enables reliable broadcast transmissions in a vehicular environment by designating a pivot vehicle used in a RTS/CTS handshake with a driven vehicle to clear transmissions by the driven vehicle to other vehicles. The pivot vehicle is selected (designated) based on knowledge of a local map. In some embodiments, the local map is created dynamically at the driven vehicle based on geographical data transmitted wirelessly in beacons from other vehicles in the vehicular environment. In alternative embodiments, the local map may be provided by a navigation system. Broadcast transmission by the driven vehicle is made possible after a CTS message is received from the pivot vehicle in response to a RTS message from the driven vehicle.

According to the invention, there is provided a method for reliable broadcast transmission in a vehicular environment comprising the steps of providing a dynamic local map and using the dynamic local map and a RTS/CTS handshake to reliably broadcast data to other vehicles in the vehicular environment.

According to the invention, there is provided a method for reliable broadcast transmission in a vehicular environment comprising the steps of providing a dynamic local map for a driven vehicle, selecting a pivot vehicle and performing a RTS/CTS handshake between the driven vehicle and the pivot vehicle, the RTS/CTS handshake allowing reliable broadcast of data by the driven vehicle to other vehicles in the vehicular environment.

According to the invention, there is provided a system for reliable broadcast transmission in a vehicular environment that includes a plurality of vehicles, comprising a driven vehicle, a pivot vehicle and means to perform a RTS/CTS handshake between the driven vehicle and the pivot vehicle, wherein the RTS/CTS handshake allows reliable broadcast of data by the driven vehicle.

BRIEF DESCRIPTION OF THE DRAWINGS

The invention is herein described, by way of example only, with reference to the accompanying drawings, wherein.

DETAILED DESCRIPTION OF THE INVENTION

The invention provides a solution to the hidden node and other problems of known vehicular communication schemes by combining geographical information (a "dynamic local map") with a RTS/CTS handshake between a driven vehicle (also referred to hereinafter as "car") and a "pivot" vehicle. The invention is described from the perspective of the driven vehicle, which may be any vehicle on the road. The location information is provided in the beacons and is collected in a geographical database by the driven vehicle. By knowing which vehicles in a specific area require information in order to analyze road events (such as emergency braking or intersection traffic-law violations) the invention enables to select a vehicle that will act as the pivot vehicle which clears interfering transmissions in its proximity. The pivot vehicle returns a CTS message to the RTS message sent by the driven vehicle.

It is emphasized that broadcast RTS/CTS solutions for a vehicular environment are not known in the art. Also not known is the use of any geographical information for selecting an optimal station as a pivot station for performing a RTS/CTS handshake.

The following describes one embodiment of a method of the invention. The method is applied in a distributed system, in which each vehicle is responsible for processing the information of all surrounding vehicles. In other words, each vehicle can process information transmitted in beacons by other vehicle. The processing in each vehicle is performed independently of the processing performed in any other vehicle. The method uses dynamic local map information and, optionally, a radio frequency (RF) coverage limit.

Figure 3:
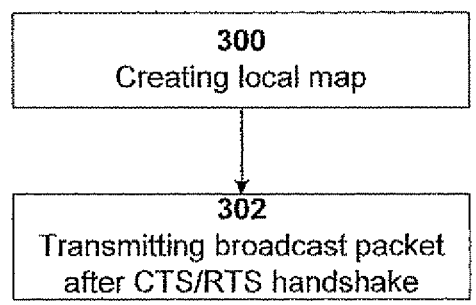
FIG. 3 is a flow chart describing the main steps of a method of the invention.

FIG. 3 is a flow chart describing the main steps. A dynamic local map is provided (or "created") in the driven vehicle in step 300. "Dynamic" refers to an incremental map building concept, which was not required and was not to build possible before the introduction of vehicular communications. The local map may be built in the driven vehicle based on beacons received from different vehicles or may be provided by a navigation system. The local map changes as the driven vehicle moves on the road. The local map is used to locate and select a pivot vehicle. In step 302, reliable broadcast transmission is performed using a RTS/CTS handshake between the driven vehicle and the pivot vehicle for reducing interferences of other transmitters in the proximity of the driven vehicle.

Figure 4:
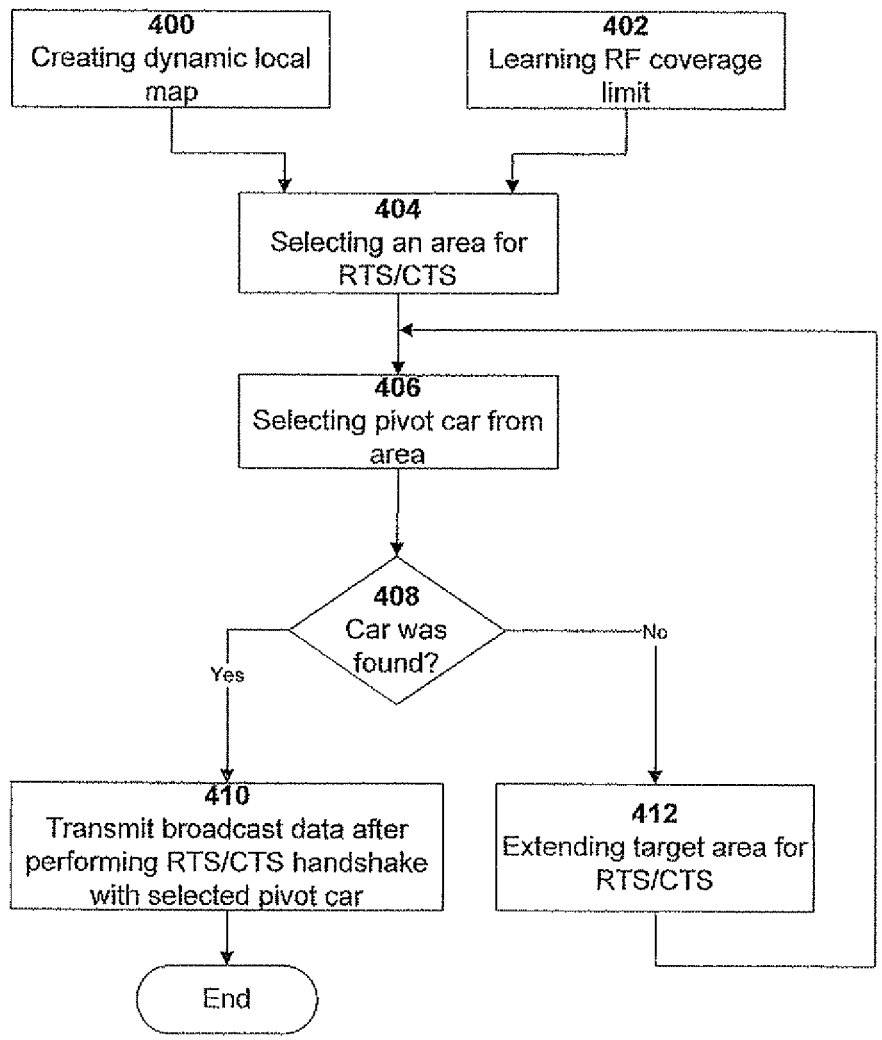
FIG. 4 provides more details on the actions performed in the method of FIG. 3.

FIG. 4 provides more details on the actions performed. The dynamic local map is created in step 400. Optionally and in parallel, an RF coverage limit (RF range") is learned by the driven vehicle in step 402. While the range of wireless systems is mostly fixed, vehicular communication imposes a significant variance in the RF range. This range depends on the topology of the environment, e.g. blocking buildings, tunnels and curves, as well as on interruptions from other vehicles such as trucks. It is assumed that the wireless link is symmetric, and that if a vehicle can be heard by the driven vehicle, then it can also hear the driven vehicle. The knowledge of the RF coverage limit is used to alleviate the effects of a hidden node.

A RTS/CTS area is selected in step 404, using the combination of the local map and the RF coverage limit. In some embodiments, the RTS/CTS area selection may be based on the dynamic local map alone. An attempt to select a pivot vehicle located inside the selected RTS/CTS area is performed in step 406. Step 408 checks if such a pivot vehicle exists in the selected RTS/CTS area. If yes, a RTS/CTS handshake is performed between the driven vehicle and the pivot vehicle, followed by data broadcast transmission by the driven vehicle in step 410. If a pivot vehicle is not found in the selected RTS/CTS area in step 408, the target are for RTS/CTS is extended, and operation returns to step 406 for an additional attempt to select a pivot vehicle within the extended RTS/CTS area.

The concept of the RF coverage limit and its learning process are explained in more detail next.

RF Coverage Limit Learning (Step 402)

In general, an RF coverage limit may learned in a number of different ways. The following is given by way of enabling example only and is by no means limiting. In the exemplary way described next, the RF coverage limit is not set based on the reading of a single vehicle, but on the combination of readings of all vehicles in proximity to the driven vehicle. Note that in order to learn the RF coverage limit, it is required to separate the driven road from any other road, since only traffic on the driven road is considered. Separating between a forward and a backward direction (relative to the driven vehicle) is also required, since different adjustments are made for each direction.

Figure 5:
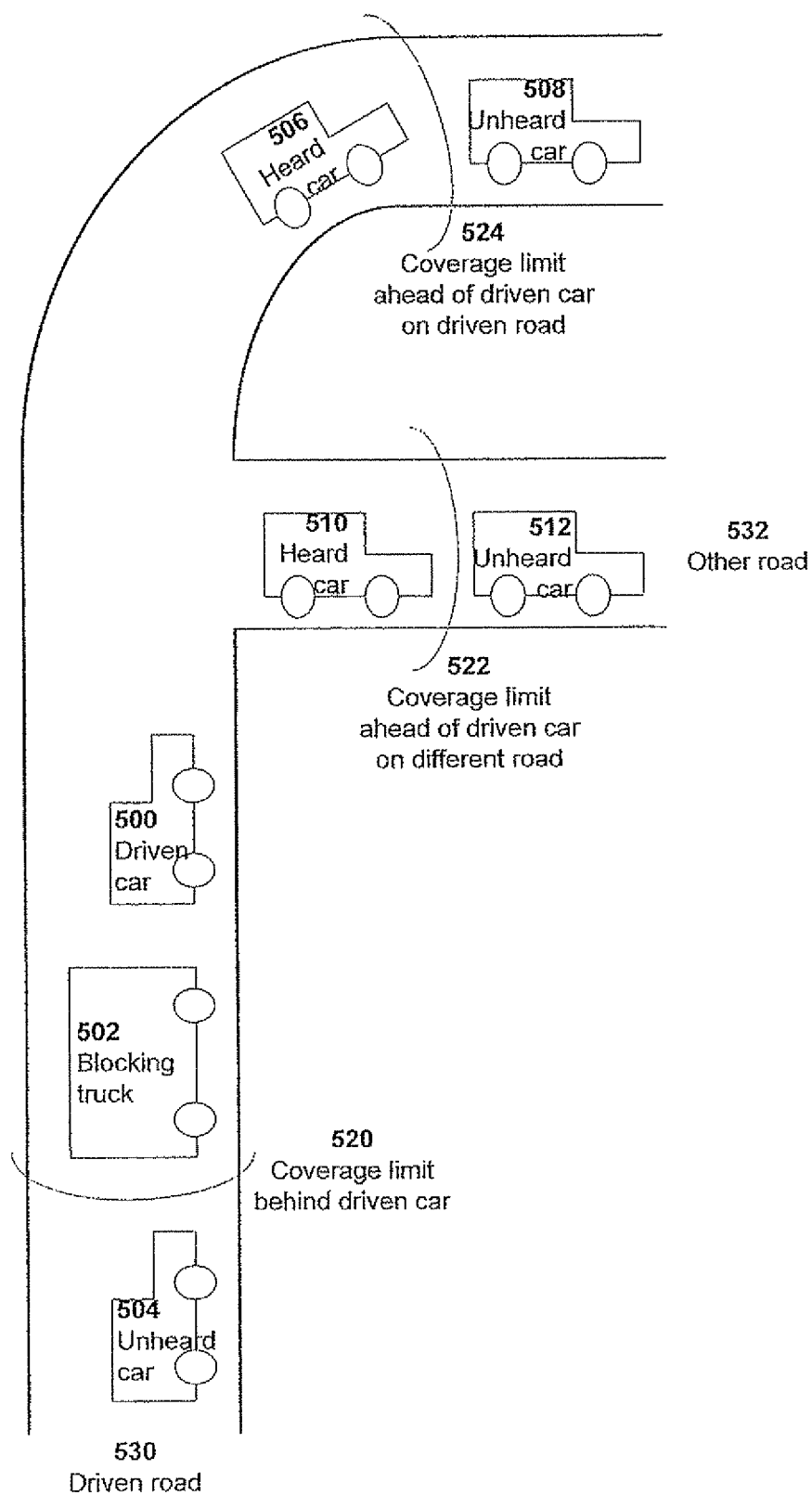
FIG. 5 illustrates the learning of a RF coverage limit.

There are four different coverage limits that need to be calculated, depending on the road: a coverage limit based on the distance in driven road ahead, a coverage limit based on the distance in driven road behind, a coverage limit based on the distance ahead on any road, and a coverage limit based on the distance behind on any road. FIG. 5 illustrates the learning of the RF coverage limit by a driven vehicle 500 on a driven road 530. A truck 502, driving behind the driven vehicle, blocks the RF link in a backward direction, so that a vehicle 504 driving behind the truck cannot hear and be heard by vehicle 500. The coverage limit 520 of vehicles driving behind the driven vehicle is therefore set approximately around the position of the truck.

Assume that driven road 530 is curving ahead. The curve blocks the RF link, so that a vehicle 508 cannot hear and be heard by vehicle 500. The coverage limit 522 for vehicles driving ahead of vehicle 500 on driven road is therefore set between vehicles 506 and 508. Similarly, vehicles 510 and 512, which turn into a different road 532, have a lower quality RF link. The coverage limit for these and any vehicles driving ahead of vehicle 500 on any road other than driven road 530 is set (by vehicle 500) between vehicles 510 and 512, since it is assumed that vehicle 510 "hears" vehicle 500, but vehicle 512 does not.

An exemplary procedure for obtaining the four average limits is as follows. Note that for a particular pivot vehicle, only one of the four limits will be relevant, since the pivot vehicle is positioned either ahead or behind the driven vehicle on the same driven road or ahead or behind the driven vehicle on another road. If a driven vehicle has two RTS/CTS areas and two pivot vehicles, one in the front and one in the back, two different limits are checked, for both forward and backward areas. The coverage limit check is as follows:

a) All four coverage limits are set initially to 0.

b) Upon reception of a transmission from a vehicle, a single one of the four coverage limits is updated. The updated value is classified based on the "received" vehicle (i.e. a vehicle from which a beacon is received by the driven vehicle) location relative to the driven vehicle (behind or ahead), and based on the similarity between roads associated with the driven vehicle and the received vehicle (same or different). An index of the updated coverage limit is denoted as [updated]. The relevant coverage limit is now updated as follows:

c) Coverage limit=Coverage limit*alpha+vehicle distance*(1−alpha), where "vehicle distance" is the distance between the driven vehicle and the received vehicle. Alpha is determined as follows:

i) When the coverage limit is greater than the vehicle distance, alpha=min (1, 16*BER+0.25) when BER information is available, and 0.9 otherwise. The goal is to increase the coverage limit when the BER is low, and to keep it at same location when the BER is higher.

ii) When the coverage limit is smaller than the vehicle distance, alpha=max (0, 1−4*BER) when BER information is available, and 0.1 otherwise. The goal is opposite to that in (2) above: decreasing the coverage limit when the BER is high, and keeping it constant when the BER is low.

The coverage limit calculation should maintain continuity over changes in the driven vehicle location (i.e. arrival of new geo-positioning system (GPS) readings) and time (i.e. completion of a 100 msec cycle of receiving beacons from all vehicles). Finally, the actual coverage limit is set to a percentage of a prior limit, for example 95%, every 10 msec. This, since a main goal is to provide fast reaction. For example, a blocking truck should immediately influence the coverage limit.

Local Map Creation (Step 400)

In map creation, a road is converted into a chain of straight lines for simple representation. This is common in map databases, where the chain is called "polyline", or "polynobal chain". An intersection is defined as a connection of three or more roads. Conventional (single driven vehicle) map creation techniques use local GPS readings from a single vehicle driven on roads, building a map database sequentially. However, the creation of a dynamic local map from transmissions of many vehicles is different and far more complex. Instead of using local GPS readings of a single vehicle, concurrent location information from many vehicles is used (potentially and exemplarily up to 200 vehicles). In contrast with the conventional map building, herein the location data received over the air is not sequential. This influences the local map creation. For example, when a vehicle drives forward, it receives sequential information on its driven road from previously undetected vehicles. The sequential information describes the continuation of the driven road. However, information received from vehicles driving on an opposite road in the opposite direction is discovered by the driven vehicle non-sequentially. Some roads are not fully described, due to limited RF reception. For example, crossing roads are detected only partially. Vehicles often maneuver, and such events should not confuse the local map creation. GPS errors of beacons received from different vehicles are uncorrelated. Accounting for this is required, which is not the case for standard mapping using a single vehicle. All of these require an innovative algorithm for map creation.

Figure 6:
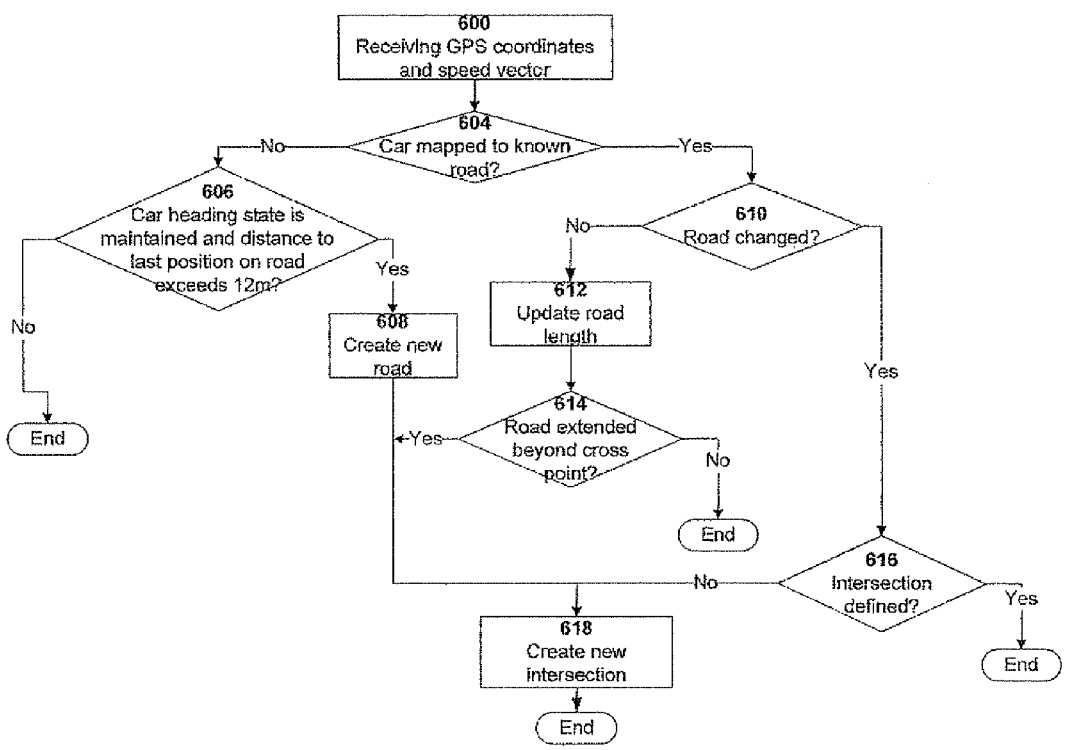
FIG. 6 described details of the process of local map creation.

A detailed description of the steps in a dynamic local map creation is given with reference to FIG. 6. As with the learning of the RF coverage limit, the detailed description here is given by way of example only. Other procedures may be used to create the dynamic local map and should be considered within the scope of the invention. Instant GPS coordinates and speed vectors for each vehicle are transmitted in step 600 in respective vehicle beacons. This information is received by all vehicles within a RF coverage limit. In step 604, a check is performed to determine whether a vehicle that has its beacon information analyzed by the driven vehicle can be mapped to any known mad. If no known road is found, a check is performed in step 606, to determine if the vehicle direction is fixed or if it deviates from a last known direction into which it was heading (e.g. if it has a distance to a last position mapped on a prior road that exceeds a certain value, for example 12 meters). A new road is created in a local map database in step 608. A new intersection is created in the local map database in step 618.

If a known road was found in step 604, then a check is performed in step 610 to check if the road associated with the vehicle having its beacon information analyzed has changed from a prior road mapping. If the road has changed, then operation continues from step 616. A check is performed if an intersection containing both original and new roads is defined. If yes, the operation ends. If no, an intersection is created in step 618. If the road in step 610 has changed, then the road length is updated in step 612. A check is performed in step 614 on an extension boundary. If the road extension exceeded a crossing road of the same height then an intersection is defined at step 618.

In summary, as particularly described with reference to steps 612 and 614, the road properties are adjusted dynamically based on received transmission. In contrast, conventional map creating algorithms perform an off-line calculation after all properties are known.

Selecting an Optimal Area for the RTS/CTS Handshake (Step 404)

Before explaining the operation, the table below provides a good overview of an optimal area for RTS/CTS handshake considering the surrounding environment. The terms "ahead", "forward", "behind" and "backward" indicate a geographic location relative to the driven vehicle. More scenarios could be added based on local regulations or requirements from auto makers.

| Driven vehicle location on local map | Optimal RIS/CIS area |
| --- | --- |
| Driving on highway, expressway or one-way urban | Backward of the driven vehicle to inform driving conditions of the road ahead. |
| Inside intersection | Forward area of driven vehicle on opposite road for "left turn assistance" and backward of the driven vehicle |
| Approaching intersection | Forward area centered in middle of intersection, and backward of the driven vehicle |
| Approaching roundabout | Forward area centered at first roads connecting to the roundabout and backward of the driven vehicle. |
| Approaching merge or highway interchange | Forward area centered on parallel road merging and backward of the driven vehicle. |
| Passing elevated bridge | Backward of the driven vehicle, preferring vehicles closer to cross |
| Approaching point without coverage | Forward area to just before coverage limit |
| Leaving point without coverage | Backward area to just after coverage limit |

Backward RTS/CTS Handshake Area Selection

Figure 7:
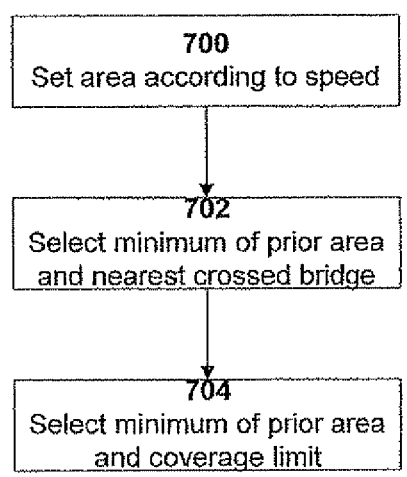
FIG. 7 shows steps in the process of the backward RTS/CTS handshake area selection.

The backward RTS/CTS area selection is described with reference to FIG. 7. Step 700 determines the optimal RTS/CTS area based on speed. At higher speed, the span of beacon reception should be extended further behind. The handshake area is selected behind the driven vehicle and equals the distance passed by the fastest vehicle on the road in a defined period, for example 4 seconds. Step 702 performs a minimalization calculation between the optimal area calculated in step 700 and the distance to the nearest crossing bridge passed on the road (i.e. selects the area closest to the driven vehicle). For example, if the optimal area was supposed to be 100 meters behind the driven vehicle, but the vehicle passed a bridge 50 meter before its current location, then the optimal area will be set around the bridge, 50 meters behind the vehicle. Step 704 performs an additional minimalization calculation between the area calculated in step 702 and the coverage limit.

Forward RTS/CTS Handshake Area Selection

Figure 8:
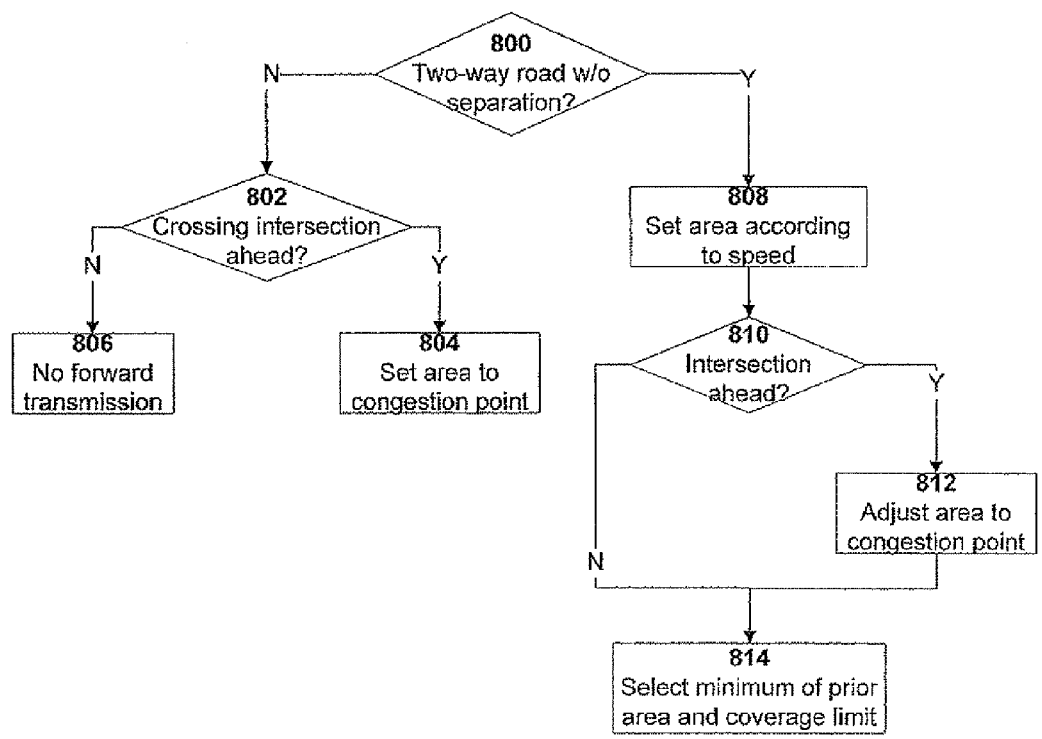
FIG. 8 shows steps in the process of the forward RTS/CTS handshake area selection.

The forward area selection is described with reference to FIG. 8. The first step, 800, checks if the road is a two-way road without a physical separation. An opposite road needs to be identified for classifying the road as two-way. The distance to the opposite road is measured, and if greater than a threshold, physical separation is assumed. When a two-way road with a physical separation is not defined (No in step 800) a check is performed in step 802. This check looks for a crossing point ahead. If no crossing point is found, step 806 determines that there is no need for forward transmission. If a crossing point is found ahead, step 804 sets the RTS/CTS area to the crossing point ahead.

If a two-way road with a physical separation is defined (Yes in step 800), then step 808 sets (determines) the area for RTS/CTS. This setting may be a function of speed, but may as well be a fixed value. In step 810, an intersection existence is checked. If the intersection exists, the optimal area is set according to the intersection as described next in step 812. In step 812, the coverage limit is compared with the calculated area. If the coverage limit is shorter, then it is selected.

Intersections are classified to 3 types: Merge, Roundabout and Conventional.

Merge:

A Merge is declared when the driven road merges with another road at an angle smaller than 45 degrees. A merge generally connects just 3 road segments. However, cases with more road segments are possible, where all angles should be <45 degrees or >135 degrees for this case.

Roundabout:

A Roundabout is declared when two or more intersections are located closely next to each other. Typically a unidirectional road circles between these intersections.

Conventional:

Any intersection that does not fall into the two definitions above.

The selected RTS/CTS area depends on the intersection type.

In an intersection, vehicles in the middle of the intersection are preferred for choice as pivot vehicles. If there are no vehicles in the intersection, then vehicles near an intersection on a crossing road, or, as last resort, vehicles near the intersection on the same road are preferred as pivot vehicles.

In a Merge, the area at a distance equal to that of the merging road from the intersection point on a parallel road is selected, when both roads have the same "speed" (i.e. the same average speed of vehicles traveling on the road).

In a Roundabout, the area between first and second exits is preferred as a RTS/CTS area. If no vehicle exists in the preferred area, then any vehicle inside the roundabout may be selected as a pivot vehicle.

Performing a RTS/CTS Handshake

The section next is an elaboration of step 406.

Transmit Function

Figure 9:
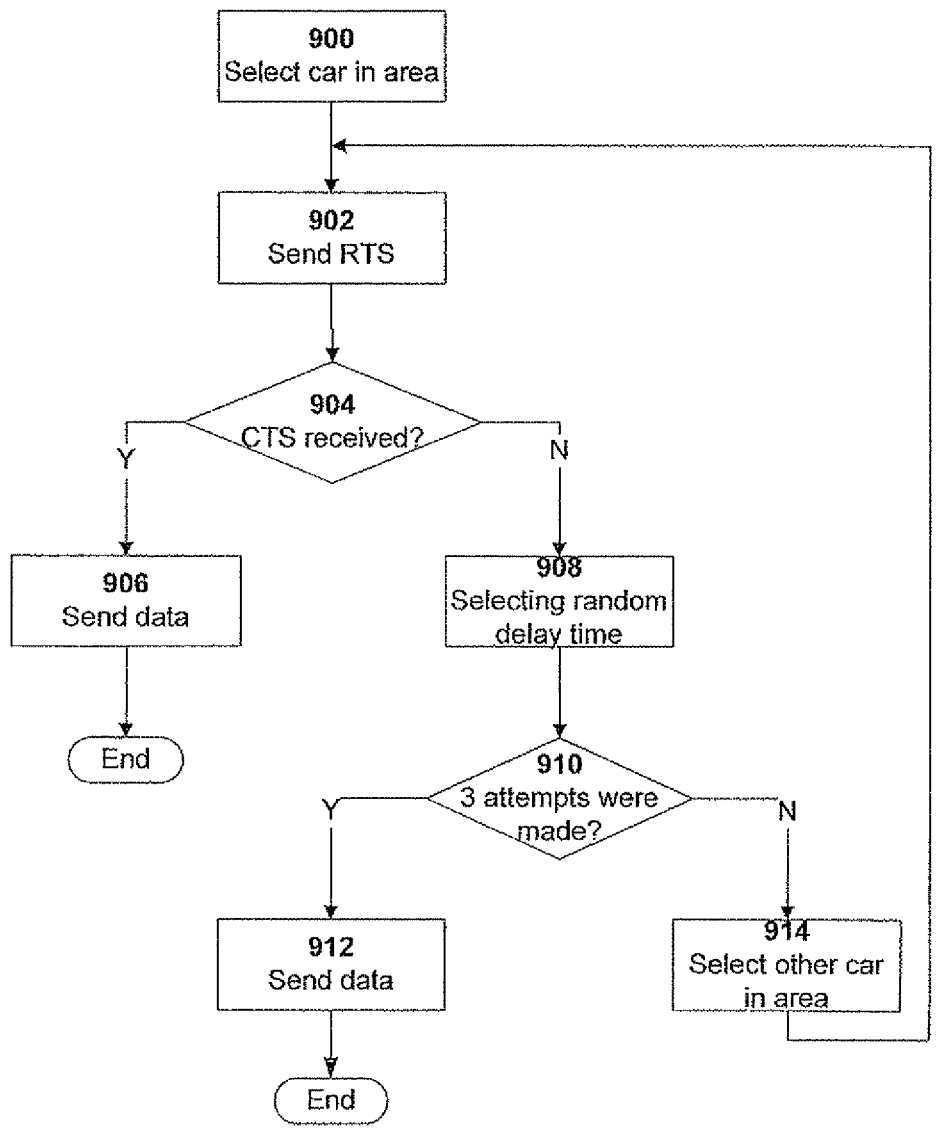
FIG. 9 describes the transmit function of the RTS/CTS handshake.

The transmit function of the RTS/CTS handshake is described with reference to FIG. 9. A vehicle is selected as pivot in step 900. A first pivot vehicle is selected preferably at the center of the optimal RTS/CTS area determined in step 404. An RTS message is transmitted by the driven vehicle in step 902. The handshake is preferably performed using maximal power control, to maximize the RF range. Alternatively, a power control scheme can be applied to limit the power of broadcast transmission. The lowest modulation index is typically used, except in backward transmission to vehicles on the same road, when the road is one-way, and where higher modulation can be used without jeopardizing the reception probability.

If a CTS message is successfully received from the selected first pivot vehicle in step 904, then data is broadcast by the driven vehicle in step 906 and the operation ends. If a CTS message is not successfully received in step 904, step 908 selects a random delay time, which is set based on the number of vehicles in proximity to the driven vehicle. The standard determines that beacon transmission must be completed within 100 msec. A high limit for a random delay selection lowers the probability of additional collisions in the next attempt, because attempts of different stations are spread more evenly over time. Exemplarily, a random value between 5 msec-20 msec will yield optimal performance. The number of transmissions is checked in step 910. If a certain number of transmissions (for example 3) were made, data is transmitted in step 912 without performing the RTS/CTS handshake. If three transmissions were not made, then a different vehicle is selected as pivot for a next attempt in step 914 and the execution returns to step 902 for completing the process.

The RTS/CTS handshake may fail for two reasons. The first one is another transmission in proximity to the chosen pivot vehicle received by the station responsible for responding RTS. The second one is the nature of the wireless link. Both reasons will potentially benefit from a different pivot vehicle selection after a handshake failure, when more than a single vehicle is located inside the optimal RTS/CTS area.

Receive Function

Figure 10:
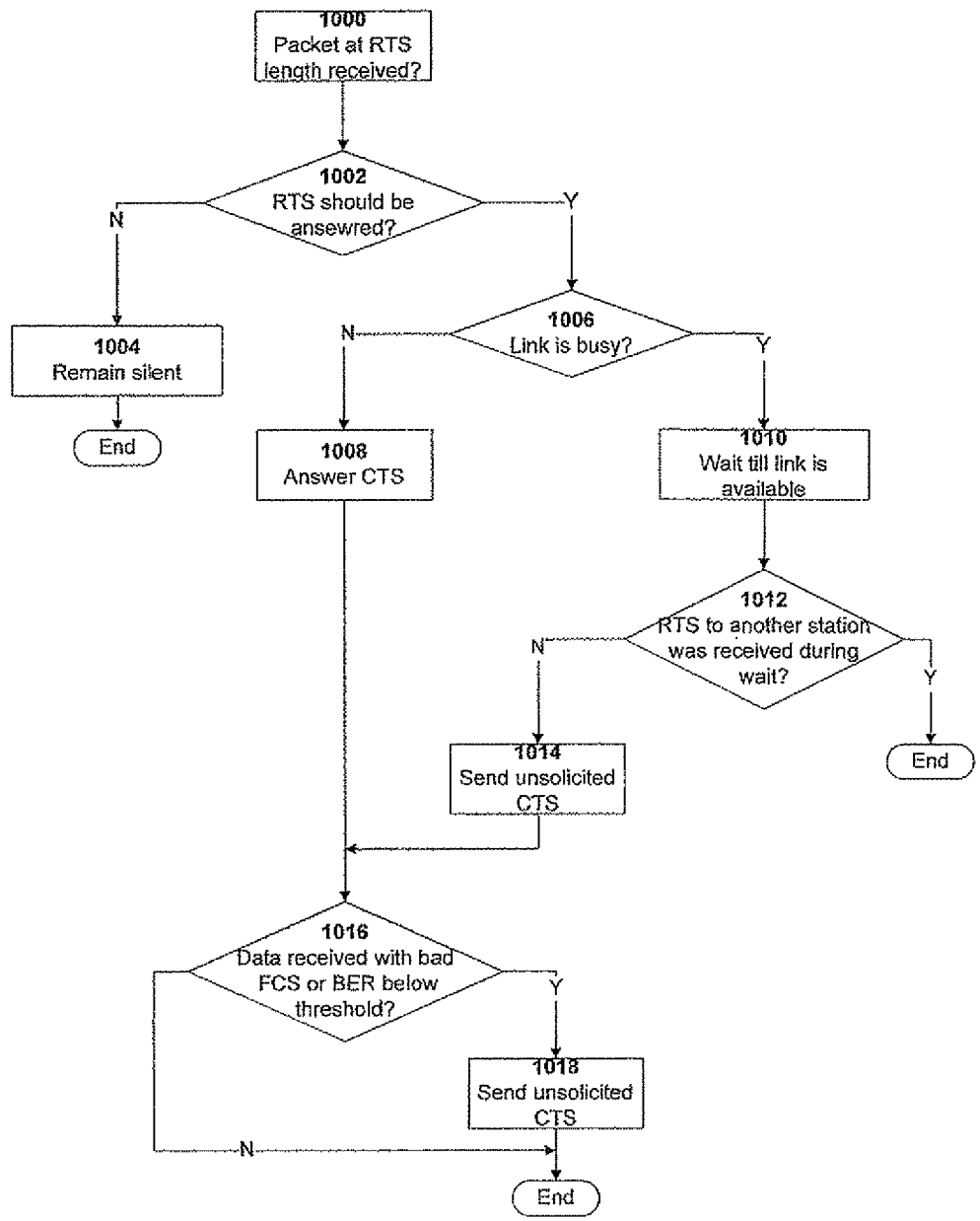
FIG. 10 describes the receive function of the RTS/CTS handshake.

The receive function of any station receiving the RTS message is described with reference to FIG. 10. The operation begins in step 1000, when a packet with the length of a RTS message is received by every vehicle. A vehicle becomes a pivot vehicle when it receives a RTS message designated specifically to it. Every packet is checked in step 1002. If invalid, as indicated by a non-matching Frame Check Sequence (FCS) value, or if the packet belongs to a station other than the pivot station, operation jumps to step 1004. In step 1004, every vehicle except the pivot vehicle remains silent. Note that in some cases a vehicle may remain silent even if the received RTS message is invalid. Also note that standard 802.11 considers only valid packets. Except the mechanisms described here, no 802.11 mechanism operates without positive parsing of packet content. By avoiding transmission, the potential risk of interrupting other transmissions is eliminated.

Wireless signals have two different thresholds: a threshold for interference and a threshold for reception (power reception threshold). When the RTS packet is destined for the pivot station, the operation continues from step 1006. If the link is not busy, then a CTS message is returned in step 1008. Data is expected in return. The validity of this data is checked in step 1016. If the check fails, or if the BER is below a configurable level, for example 0.05, then the data is declared invalid. The BER conditioning is innovative Optionally, each packet is protected by a Viterbi code. A packet with many errors can still be accepted after the Viterbi decoder correction, but it will most likely be rejected by stations located at a greater distance from the driven car. By forcing retransmission at this case, the probability of other stations receiving the data increases. Optionally, retransmission is forced by sending an unsolicited CTS message in step 1018. This step is innovative because it establishes a method for acknowledging broadcast packets, currently non-existing in 802.11 based networks, by utilizing the RTS/CTS handshake.

If the link was busy in step 1006, then operation resumes from step 1010. The pivot station waits until the link is free. If during this time it is detected that the station has sent a RTS message to a different station, as checked in step 1012, then the operation ends. Otherwise, an unsolicited CTS message is optionally sent in step 1014. This innovative step provides optimal allocation of channel resources by scheduling a prior failed request to retransmit when the link becomes available.

EXAMPLE OF USE

Figure 11:
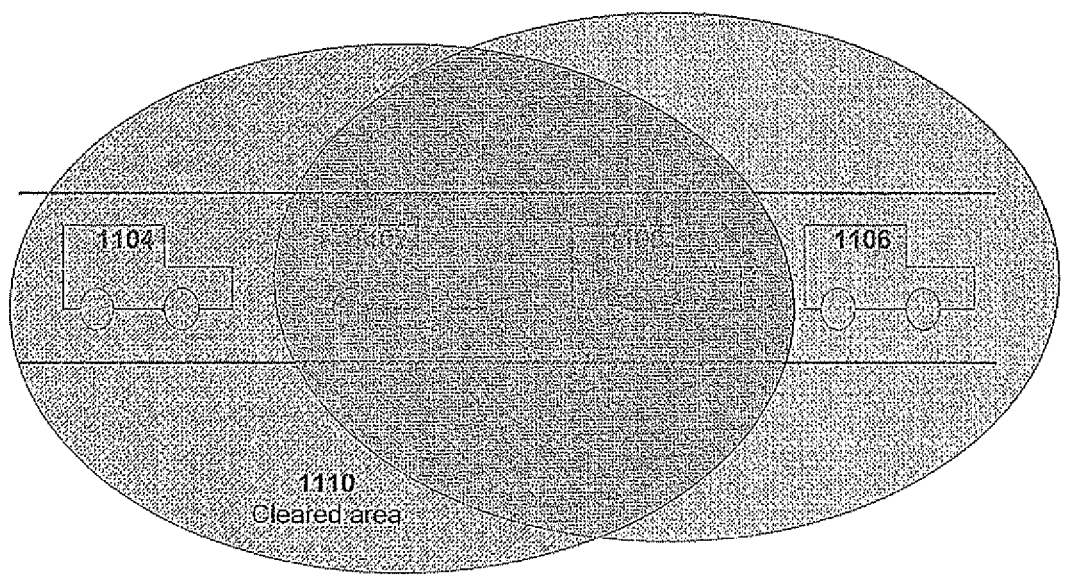
FIG. 11 shows an example for the application of a method of the invention to vehicles on a single road.

An exemplary demonstration of the concept of reliable vehicular broadcast using a local map and a RTS/CTS handshake disclosed herein is illustrated using FIG. 11. A vehicle 1100 sends a RTS message toward a pivot vehicle 1102, which answers with a CTS message. This constitutes the RTS/CTS "handshake" between vehicles 1100 and 1102. All other vehicles in proximity hearing this exchange are required to stay silent for the duration indicated in the RTS/CTS messages. This results in a "cleared area", 1110, which is marked by the combined area of the two circles, including the overlapping area. Now, a vehicle 1104 does not interfere, since it received the CTS message of vehicle 1102. Vehicle 1106 does not interfere either.

Figure 1:
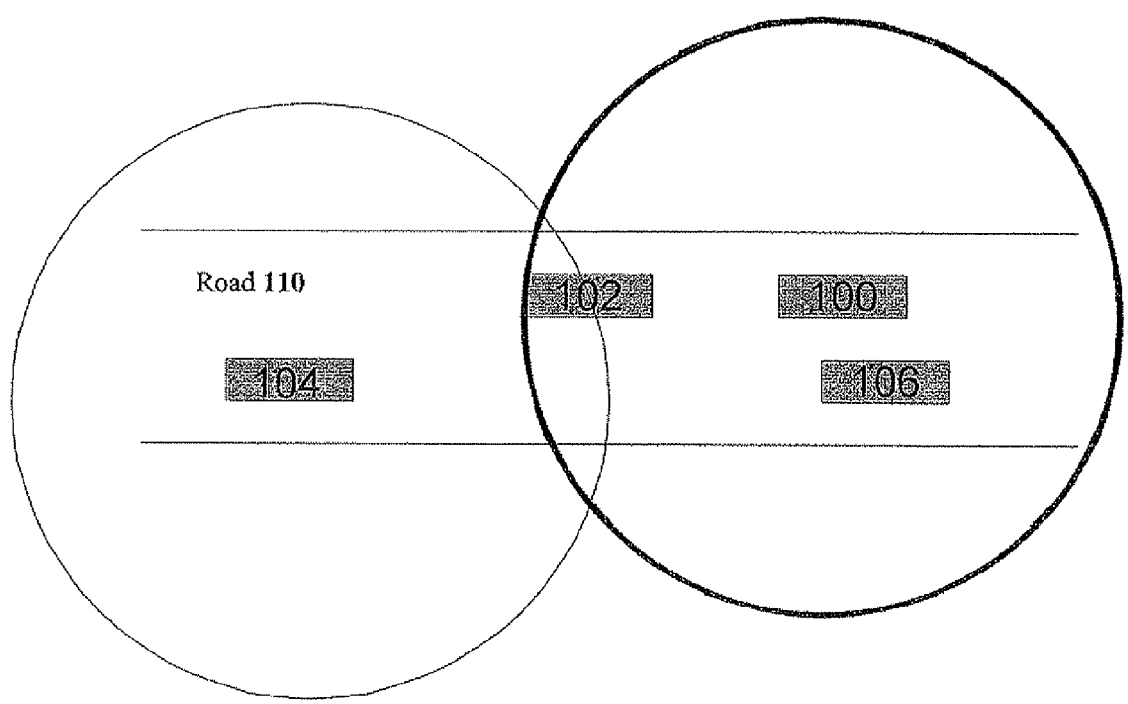
FIG. 1 illustrates the hidden node problem on a road.
Figure 2:
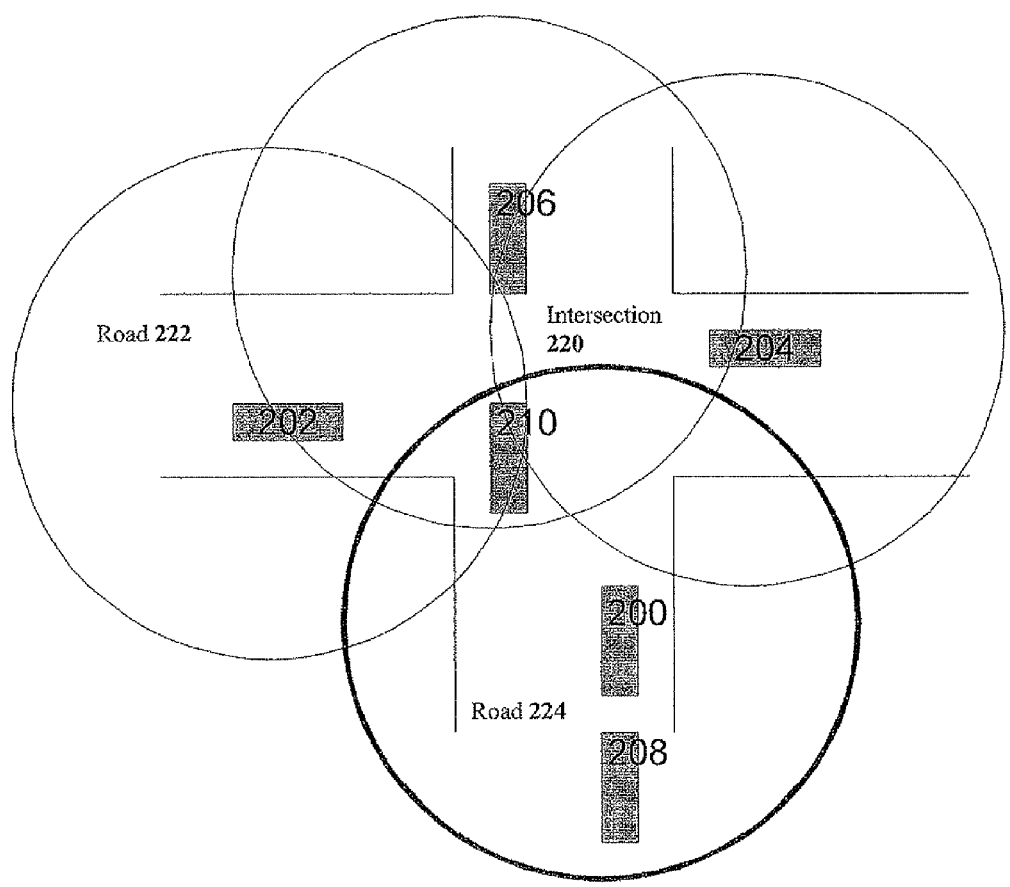
FIG. 2 illustrates the hidden node problem at an intersection.
Figure 12:
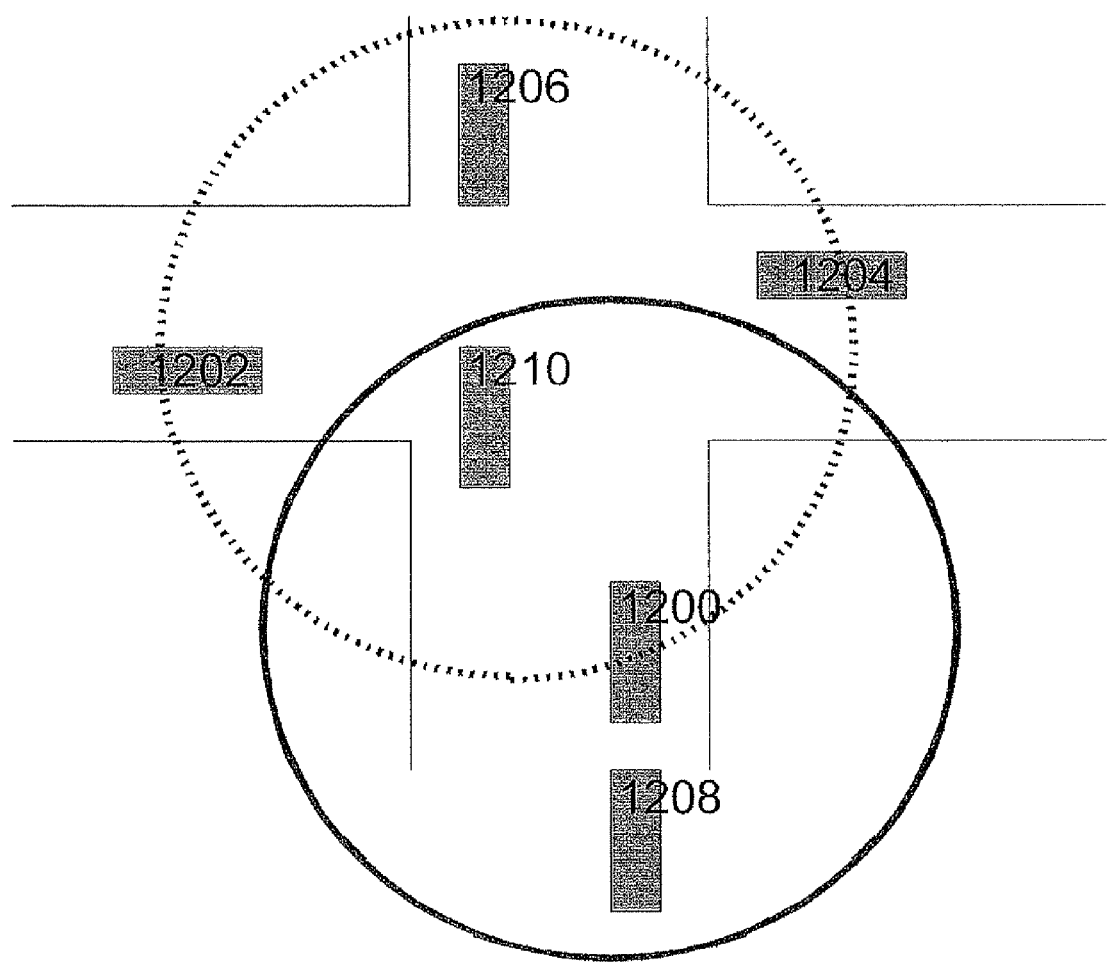
FIG. 12 shows an example for the application of a method of the invention to vehicles at an intersection.

The more serious problem at an intersection is solved by picking a pivot vehicle inside the intersection as the responder in the RTS/CTS handshake. This vehicle acts as an access point for the sake of this transmission in the handshake, coordinating between different vehicles. FIG. 12 is similar to FIG. 2. Here, a pivot vehicle 1210 receives a RTS message and responds with a CTS message. Vehicle 1210 has the best wireless path to all vehicles (1200, 1202, 1204, 1206, 1208) in the intersection. All vehicles receiving its transmission (i.e. 1200, 1202, 1204, 1206, 1208) remain silent.

The various features and steps discussed above, as well as other known equivalents for each such feature or step, can be mixed and matched by one of ordinary skill in this art to perform methods in accordance with principles described herein. Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein. In particular, the usage of the reliable broadcast scheme disclosed herein is applicable in every type of broadcast transmission, including beacon transmissions, as well as geocast broadcast transmissions and IEEE1609 service creation messages.

Accordingly, drawings, tables, and description disclosed herein illustrate technologies related to the invention, show examples of the invention, and provide examples of using the invention and are not to be construed as limiting the present invention. Known methods, techniques, or systems may be discussed without giving details, so to avoid obscuring the principles of the invention. As it will be appreciated by one of ordinary skill in the art, the present invention can be implemented, modified, or otherwise altered without departing from the principles and spirit of the present invention. Therefore, the scope of the present invention should be determined by the following claims and their legal equivalents.

All publications mentioned in this specification are herein incorporated in their entirety by reference into the specification, to the same extent as if each individual publication was specifically and individually indicated to be incorporated herein by reference. In addition, citation or identification of any reference in this application shall not be construed as an admission that such reference is available as prior art to the present invention.

The invention claimed is:

1. A method for reliable broadcast transmission by a moving driven vehicle comprising the steps of:
   a) providing a local road map that changes dynamically, as the driven vehicle moves, according to transmissions of at least one other vehicle; and
   b) using the local road map and a request to send/clear to send (RTS/CTS) handshake to reliably broadcast data to other vehicles in the vehicular environment.

2. The method of claim 1, wherein the step of providing a local map includes creating the local road map incrementally at the driven vehicle.

3. The method of claim 1, wherein the step of providing a local map includes obtaining the local road map from a navigation system.

4. The method of claim 1 further including the steps of:
   c) determining a radio frequency (RF) coverage limit; and
   d) using the RF coverage limit in conjunction with the local road map and the RTS/CTS handshake to reliably broadcast the data.

5. The method of claim 2, wherein the creating a local map incrementally includes creating the local road map using GPS information received in a plurality of beacons transmitted by a respective plurality of vehicles, wherein each beacon is associated with a particular vehicle.

6. The method of claim 4, wherein the step of determining a RF coverage limit includes learning the RF coverage limit iteratively.

7. The method of claim 1, wherein the step of using the local road map and a RTS/CTS handshake includes:
   i. determining a RTS/CTS area; and
   ii. performing the RTS/CTS handshake with a pivot vehicle within the RTS/CTS area.

8. A method for reliable broadcast transmission in a vehicular environment comprising the steps of:
   a) providing a dynamic local map, for a driven vehicle;
   b) selecting a pivot vehicle;
   c) performing a request to send/clear to send (RTS/CTS) handshake between the driven vehicle and the pivot vehicle to allow reliable broadcast of data by the driven vehicle to other vehicles in the vehicular environment; and
   d) subsequent to said handshake, broadcasting the data by the driven vehicle to the other vehicles in the vehicular environment.

9. The method of claim 8, wherein the step of selecting a pivot vehicle includes selecting the pivot vehicle based on the dynamic local map.

10. The method of claim 8, wherein the step of selecting a pivot vehicle includes selecting the pivot vehicle based on the dynamic local map and on a radio frequency (RF) coverage limit.

11. The method of claim 8, wherein the step of providing a dynamic local map includes creating the dynamic local map incrementally at the driven vehicle.

12. The method of claim 8, wherein the step of providing a dynamic local map includes obtaining the dynamic local map from a navigation system.

13. The method of claim 11, wherein the creating a dynamic local map incrementally includes creating the dynamic local map using GPS information received in a plurality of beacons transmitted by a respective plurality of vehicles, wherein each beacon is associated with a particular vehicle.

14. The method of claim 10, wherein the RF coverage limit is learned iteratively by the driven vehicle.

15. The method of claim 8, wherein the dynamic local map is a local road map that changes dynamically, as the driven vehicle moves, according to transmissions of at least one other vehicle.

16. The method of claim 8, wherein the pivot vehicle is selected by the driven vehicle.

17. A system for reliable broadcast transmission in a vehicular environment that includes a plurality of vehicles, comprising:
   a) driven vehicle;
   b) means to provide, to the driven vehicle, a dynamic local map;
   c) means for the driven vehicle to select a pivot vehicle based on the dynamic local map; and
   d) means to perforin a request to send/clear to send (RTS/CTS) handshake between the driven vehicle and the pivot vehicle to allow reliable broadcast of data by the driven vehicle to other vehicles in the vehicular environment.

* * * * *